United States Patent
Riedel

(10) Patent No.: US 10,712,989 B2
(45) Date of Patent: Jul. 14, 2020

(54) VISUAL OUTPUT ASSEMBLY FOR AIRCRAFT CABIN

(71) Applicant: AIRBUS OPERATIONS GMBH, Hamburg (DE)

(72) Inventor: Christian Riedel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/707,644

(22) Filed: Sep. 18, 2017

(65) Prior Publication Data
US 2018/0081615 A1 Mar. 22, 2018

(30) Foreign Application Priority Data
Sep. 20, 2016 (EP) .................................. 16189748

(51) Int. Cl.
| | | |
|---|---|---|
| G06F 3/14 | (2006.01) | |
| B64D 11/00 | (2006.01) | |
| G09G 5/10 | (2006.01) | |
| G09G 5/12 | (2006.01) | |

(52) U.S. Cl.
CPC ........ *G06F 3/1423* (2013.01); *B64D 11/0015* (2013.01); *G09G 5/10* (2013.01); *G09G 5/12* (2013.01); *B64D 2011/0038* (2013.01); *B64D 2011/0061* (2013.01); *G09G 2320/0626* (2013.01); *G09G 2380/12* (2013.01)

(58) Field of Classification Search
CPC .......... G06F 3/1423; G09G 5/12; G09G 5/10; G09G 2380/12; G09G 2320/0626; B64D 11/0015; B60Q 3/43; B60Q 3/47
See application file for complete search history.

(56) References Cited

U.S. PATENT DOCUMENTS

| | | | |
|---|---|---|---|
| 7,070,150 B2 * | 7/2006 | Jones .................... | A61M 21/02 244/118.5 |
| 9,558,715 B2 | 1/2017 | Velten et al. | |
| 2002/0167531 A1 * | 11/2002 | Baudisch .............. | G06F 3/1438 345/611 |
| 2009/0112638 A1 | 4/2009 | Kneller et al. | |
| 2010/0128020 A1 * | 5/2010 | Oh ........................ | G06F 3/1446 345/213 |

(Continued)

FOREIGN PATENT DOCUMENTS

| | | | | |
|---|---|---|---|---|
| CN | 102438357 | * | 5/2012 | |
| CN | 203845021 | * | 9/2014 | ............. B64D 47/08 |

(Continued)

OTHER PUBLICATIONS

Romeo, Panasonic Avionics eyes 4K Ultra-HD displays for aircraft cabins, URL: https://runwaygirlnetwork.com/2015/06/02/panasonic-avionics-eyes-4k-ultra-hd-displays-for-aircraft-cabins/ (Year: 2015).*

(Continued)

*Primary Examiner* — Phuc N Doan
(74) *Attorney, Agent, or Firm* — Jenkins, Wilson, Taylor & Hunt, P.A.

(57) ABSTRACT

A visual output assembly for an aircraft cabin includes at least one electronic display device, a projection screen, an image projector configured to project images onto the projection screen, and at least one illumination device.

17 Claims, 1 Drawing Sheet

(56) References Cited

U.S. PATENT DOCUMENTS

| | | | | |
|---|---|---|---|---|
| 2010/0214496 A1* | 8/2010 | Vogel | ............... | B64D 11/0015 348/744 |
| 2012/0325962 A1* | 12/2012 | Barron | ............... | B64D 11/0015 244/118.5 |
| 2013/0038631 A1* | 2/2013 | DeMers | ............... | B64D 11/0015 345/633 |
| 2013/0169807 A1* | 7/2013 | de Carvalho | ............... | H04N 7/183 348/144 |
| 2013/0314552 A1* | 11/2013 | Miaw | ............... | H04N 17/02 348/189 |
| 2014/0085337 A1* | 3/2014 | Velten | ............... | B64D 11/0015 345/635 |
| 2014/0092206 A1* | 4/2014 | Boucourt | ............... | B64D 47/08 348/36 |
| 2015/0170604 A1 | 6/2015 | Iwagaki et al. | | |
| 2015/0370322 A1* | 12/2015 | Gustafson | ............... | G06F 3/1423 345/156 |
| 2016/0274674 A1* | 9/2016 | Valdes | ............... | B64D 11/0015 |
| 2016/0325836 A1* | 11/2016 | Teo | ............... | B64D 11/0015 |
| 2016/0328202 A1* | 11/2016 | Ritter | ............... | G06F 3/1431 |
| 2017/0094166 A1* | 3/2017 | Riedel | ............... | B64D 11/00 |
| 2017/0094167 A1* | 3/2017 | Riedel | ............... | H04N 13/218 |
| 2017/0134786 A1* | 5/2017 | Dame | ............... | H04N 21/41422 |
| 2017/0286037 A1* | 10/2017 | Sizelove | ............... | G06F 3/14 |

FOREIGN PATENT DOCUMENTS

| | | | |
|---|---|---|---|
| DE | 102007008164 | * | 8/2008 |
| DE | 102007008164 A1 | | 8/2008 |
| EP | 2711294 A1 | | 3/2014 |
| WO | WO 2014/075040 A1 | | 5/2014 |
| WO | WO2016166666 | * | 4/2016 ............ B64D 11/00 |

OTHER PUBLICATIONS

Extended European Search Report for Application No. 16189748 dated Apr. 12, 2017.

* cited by examiner

VISUAL OUTPUT ASSEMBLY FOR AIRCRAFT CABIN

CROSS-REFERENCE TO RELATED APPLICATION

This application claims priority to European Patent Application EP 16 189 748.3, filed Sep. 20, 2016, the entire disclosure of which is incorporated by reference herein.

TECHNICAL FIELD

The present disclosure relates to a visual output assembly, specifically for cabins in airborne vehicles, an aircraft with an aircraft cabin having a visual output assembly and a method for displaying visual output in an aircraft cabin.

BACKGROUND

Document DE 10 2007 008 164 A1 discloses a method for blurring the boundaries between the display screen of an imaging system and adjacent illuminated surfaces by adapting the illumination of the surfaces to the images currently displayed on the display screen.

There is, however, a need for improved solutions that enable passengers of an aircraft to enjoy improved imagery at a cabin wall of the aircraft cabin.

SUMMARY

A first aspect of the disclosure pertains to a visual output assembly for an aircraft cabin comprising at least one electronic display device, a projection screen, an image projector configured to project images onto the projection screen, and at least one illumination device.

According to a second aspect of the disclosure, an aircraft comprises an aircraft cabin having a visual output assembly according to the first aspect of the disclosure. The visual output assembly may in some embodiments be mounted on a cabin wall of the aircraft cabin of the aircraft.

According to a third aspect of the disclosure, a method for displaying visual output in an aircraft cabin comprises displaying first image data items on at least one electronic display device, projecting second image data items on a projection screen using an image projector configured to project images onto the projection screen, and controlling illumination parameters of at least one illumination device matching with the first image data items and/or the second image data items.

An idea on which the present disclosure is based is to provide a combined configuration of electronic displays, projectors and illumination devices. This combination may increase the impression of the image content, offer a high dynamic and impressive imaging and offer a high scope for design. The combination is particularly advantageous for windowless areas of an aircraft cabin. In order to combat fatigue, jetlag and other flight-induced negative side conditions of passengers, the visual output assembly allows for impressive image flight phase scenarios in a relaxing atmosphere.

According to an embodiment of the visual output assembly, the at least one electronic display device may be arranged next to the projection screen.

According to another embodiment of the visual output assembly, a displaying surface of the at least one electronic display device may be arranged coplanar to the displaying surface of the projection screen.

According to another embodiment of the visual output assembly, the at least one electronic display device may include at least one device of the group of cathode ray tube displays, light-emitting diode displays, electroluminescent displays, electronic paper displays, plasma display panels, liquid crystal displays, high-performance addressing displays, thin-film transistor displays, organic light-emitting diode displays, surface-conduction electron-emitter displays, field emission displays, laser displays, carbon nanotube displays, quantum dot displays, interferometric modulator displays and digital microshutter displays.

According to another embodiment of the visual output assembly, the image projector may include at least one device of the group of video projectors, movie projectors, overhead projectors, slide projectors, laser projectors and LED projectors.

According to another embodiment of the visual output assembly, the visual output assembly may further comprise an image data controller coupled to the at least one electronic device and the image projector, the image data controller configured to control the at least one electronic device and the image projector to display portions of an image data stream in synchronicity. In some embodiments, the visual output assembly may further comprise a display driver coupled between the image data controller and the at least one electronic device.

According to another embodiment of the visual output assembly, the image data controller may further be configured to receive an image data stream, divide the image data stream into at least one first image data stream segment and at least one second image data stream segment, to control the at least one electronic device to display the at least one first image data stream segment, and to control the image projector to project the at least one second image data stream segment to the projection screen.

According to another embodiment of the visual output assembly, the image data controller may further be configured to control illumination parameters of the at least one illumination device to match with the received image data stream.

According to some embodiments of the method, the first image data items may correspond to first image data stream segments of an image data stream. In some embodiments, the second image data items may correspond to second image data stream segments of the image data stream. In some embodiments of the method, the first image data items and the second image data items may be synchronized to each other.

According to some embodiments of the method, the first image data items and the second image data items are image data items belonging to a flight image phase scenario that are synchronized to the controlled illumination parameters of the at least one illumination device. Flight image phase scenarios may be specifically tailored imagery content that takes into account the flight phase, the time of the day, the itinerary, the distance to destination and/or starting location, the current weather conditions and/or the type of flight. Depending on one or more of those external parameters, one out of several preconfigured and pre-stored flight image phase scenarios may be selected for display and projection using the visual output assembly.

BRIEF DESCRIPTION OF THE DRAWINGS

The disclosure herein will be explained in greater detail with reference to example embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
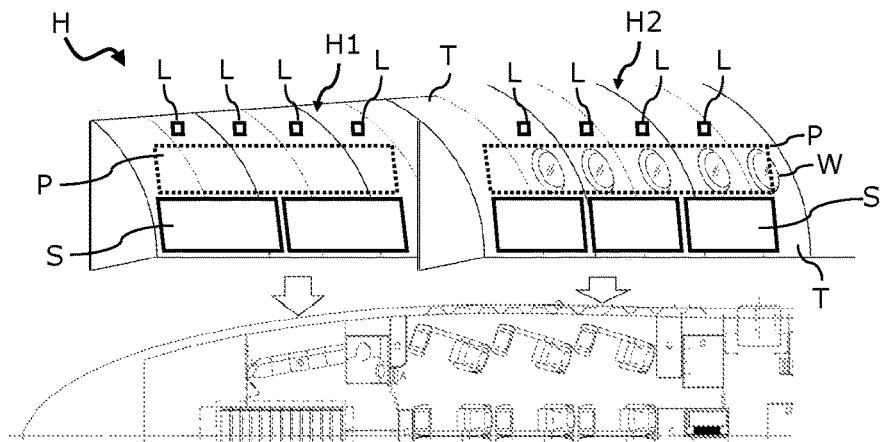
FIG. 1 schematically illustrates an exemplary part of a fuselage of an aircraft cabin with a visual output assembly installed therein according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Electronic display devices within the meaning of the present disclosure comprise any electronically controlled display device which is capable of optically conveying variable information to an onlooker. Electronic displays may for example include cathode ray tube displays, light-emitting diode displays, electroluminescent displays, electronic paper displays, plasma display panels, liquid crystal displays, high-performance addressing displays, thin-film transistor displays, organic light-emitting diode displays, surface-conduction electron-emitter displays, field emission displays, laser displays, carbon nanotube displays, quantum dot displays, interferometric modulator displays, digital microshutter displays or similar.

Image projectors within the meaning of the present disclosure comprise any optical device adapted to projects one or more images or moving images in series onto a projection surface. Image projectors may for example include video projectors, movie projectors, overhead projectors, slide projectors, laser projectors, LED projectors or similar.

FIG. 1 shows a schematic illustration of a portion H of a fuselage of an airborne vehicle as it may be for example be employed in the fore of an aircraft, particularly a passenger aircraft. FIG. 3 exemplarily depicts an aircraft A comprising such a fuselage H as explained and described in conjunction with FIGS. 1 and 2. Of course, other airborne vehicles such as helicopters, zeppelins or spaceships may be used with the visual output assembly of the disclosure herein as well.

The fuselage H of an airborne vehicle may have different section H1, H2 which may be made up by fuselage panels T. Some sections, as for example the section H1, may not have any physical windows installed in the panels T, while other sections, as for example the section H2, may have physical windows W installed in the panels T. Windowless sections H1 may for example be commonly found in conical or bulk sections in which the installation of windows is regularly complicated and expensive. Such windowless sections H1 may be interesting for airlines to implement with additional passenger seats, however, passengers' comfort and acceptance is highly impacted by the possibility to get a view of outside the aircraft.

Figure 2:
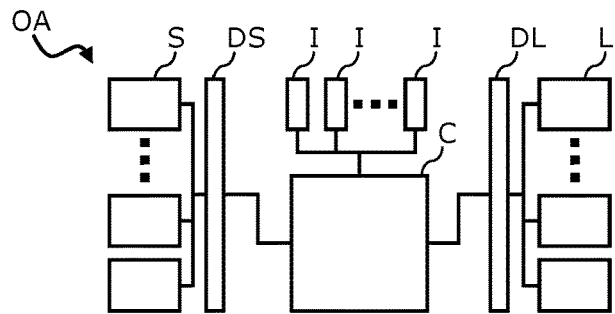
FIG. 2 schematically illustrates a block diagram of components of a visual output assembly according to a further embodiment of the disclosure herein.
Figure 3:
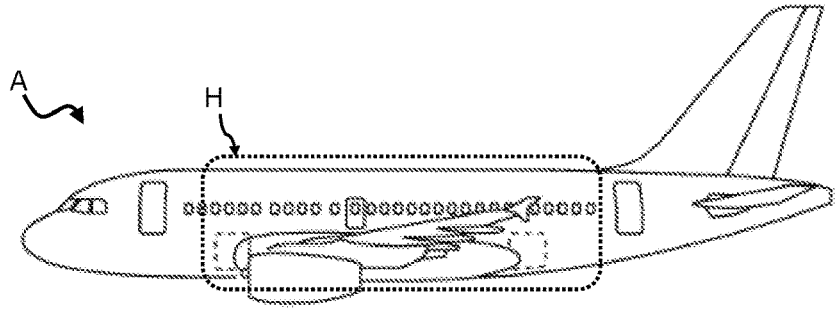
FIG. 3 schematically illustrates an aircraft having a visual output assembly installed in an aircraft cabin according to another embodiment of the disclosure herein.

As exemplarily illustrated in FIG. 2, both windowless sections H1 and sections H2 with windows W may be equipped with a visual output assembly OA. The visual output assembly OA includes at least one electronic display device S, a projection screen P, at least one image projector I and at least one illumination device L. The image projector(s) I may be configured to project images onto the projection screen P. In some cases, multiple image projectors I may be provided to project image data on different projection screens P, on different portions of a single projection screen P and/or with different projection angles. The number of electronic display devices S is for example depicted with two and three, respectively, for each of the fuselage sections H1 and H2, however, it will be understood that any other number as appropriate and desired may be chosen for the electronic display devices S. Only one projection screen P arranged above the row of electronic display devices S is for example shown in FIG. 1, however, it will be understood that the orientation of the projection screen P may be chosen differently as well. Particularly, it may also be possible to provide separate areas on the cabin wall that serve as different portions of the projection screen P.

The number of illumination devices L is for example depicted with four for each of the fuselage sections H1 and H2, however, it will be understood that any other number as appropriate and desired may be chosen for the number of illumination devices L as well. The illumination devices L are illustrated as being arranged above the projection screen P, however, it will be understood that the illumination devices L may be arranged at different locations with respect to the electronic display devices S and or the projection screen P as well. The illumination devices L may for example be LED luminaires, such as LED luminaires arranged behind a hatrack at the ceiling of the aircraft cabin.

The electronic display devices S may in some case be arranged next to the projection screen P in order to have a fluid boundary between image data displayed on the electronic display devices S and projected onto the projection screen P, respectively. For example, a displaying surface of the electronic display devices S may be arranged coplanar to the displaying surface of the projection screen P in order to create such a fluid image boundary for an onlooker.

As shown in the block diagram of FIG. 2, the visual output assembly further comprises an image data controller C that is adapted or configured to control each of the components of the visual output assembly and coordinate the image data displayed on the electronic display devices S and projected onto the projection screen P, respectively. The image data controller C is coupled to the electronic devices S, for example via a display device driver DS. The image data controller C is further coupled to one or more image projectors I. The image data controller C is configured to control the electronic devices S and the image projector(s) I to display portions of an image data stream in synchronicity.

Such image data stream may for example be received at the image data controller C, for example from an external data source connected to the image data controller C. The image data controller C then divides the image data stream into at least one first image data stream segment and at least one second image data stream segment. The first image data stream segment is sent to the electronic devices S to display the at least one first image data stream segment, and the second image data stream segment is sent to the image projector(s) I to project the at least one second image data stream segment to the projection screen P. This may be done in such a way that the spatial segmentation of the first and second image data stream segments matches the spatial orientation of the electronic devices S and the projection screen P with respect to each other.

Additionally, the image data controller C may further be configured to control illumination parameters of the at least one illumination device L to match with the received image data stream. For example, the illumination devices L may be controlled and adjusted in their hue, brightness, luminance, color intensity, chromaticity, saturation or other illumination parameters. The image data controller C may for example analyze optical image parameters in the received image data stream and control and adjust the illumination parameters of the illumination devices L accordingly. In other cases, the received image data stream may be predefined and the image data controller C may receive a corresponding parameter adjustment sequence for the illumination parameters that matches the predefined image data stream from an external source.

It may for example be possible to mount a multitude of electronic display devices S side-by-side in a horizontal line along the extension of the fuselage, i.e. the electronic display devices S may be arranged similarly to the physical windows W themselves mounted along the side walls of the fuselage H in order to create the illusion that the displays are actually windows. There may for example be side view virtual window displays that create a three-dimensional panorama view. The field and side viewing angle may be similar to that of an aircraft window for all passengers over all displays.

The electronic display devices S may for example be each configured to display image data in Ultra HD 4K or Ultra HD 8K, i.e. displays that have an aspect ratio of 16:9 and at least one digital input capable of carrying and presenting native video at a minimum resolution of 3840×2160 pixels. Specifically, Ultra HD 4K is a video format allowing a resolution of 3840 pixels wide by 2160 pixels tall, and Ultra HD 8K is a video format allowing a resolution of 7680 pixels wide by 4320 pixels tall.

The image data displayed with the electronic display devices S and/or on the projection screen P may for example be captured with cameras C, such as fisheye lens cameras, i.e. cameras with an ultra wide-angle lens that produces strong visual distortion intended to create a wide panoramic or hemispherical image. The cameras C may be mounted on or at least directed to the outside of the aircraft. Such fisheye lens cameras may for example have an angle of view of approximately 180°. Current camera technology allows for a chip sensor resolution of Ultra HD 4K or Ultra HD 8K over a viewing angle of 360°. If one ultra wide-angle lens camera C with a viewing angle of about 180° is employed for each side of the aircraft fuselage H, the resolution will be approximately half of the chip sensor resolution.

Figure 4:
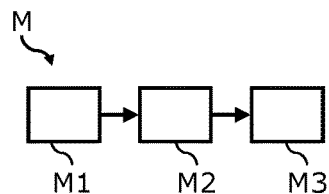
FIG. 4 schematically illustrates stages of a method for displaying visual output in an aircraft cabin according to yet another embodiment of the disclosure herein.

FIG. 4 schematically illustrates stages of a method M for displaying visual output in an aircraft cabin of an aircraft, such as the aircraft A of FIG. 3. The method M may for example be used in an aircraft A as shown in FIG. 3 and may make use of a visual output assembly as explained in conjunction with the FIGS. 1 and 2.

The method M comprises in a first stage M1 displaying first image data items on at least one electronic display device S. In a second stage M2—and possibly concurrently with the first stage M1—second image data items are projected on a projection screen P using an image projector I configured to project images onto the projection screen P. Finally, in a third stage M3, illumination parameters of at least one illumination device L are controlled, which illumination parameters match with the first image data items and/or the second image data items.

In some cases, the first image data items may correspond to first image data stream segments of an image data stream, and the second image data items may correspond to second image data stream segments of the image data stream. The first image data items and the second image data items may in particular be synchronized to each other. The first image data items and the second image data items may in some cases be image data items belonging to one or more flight image phase scenarios that are synchronized to the controlled illumination parameters of the at least one illumination device. Flight image phase scenarios may in particular be preconfigured settings of image data which match to external flight parameters such as the destination address, the starting address, the current location of the aircraft, the current weather conditions, the time of the day, the season, the flight phase (taxiing, landing, take-off, cruise flight), the flight altitude or similar parameters. The preconfigured settings of image data may for example comprise simulated sunrises, simulated sunsets, abstract arrangements or colored symbols or single images such as flowers or animals or pre-captured footage of holiday destination such as beaches, forests, mountain sceneries or the like.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A visual output assembly for an aircraft cabin, comprising:
    at least one electronic display device on an inner surface of a fuselage of an aircraft;
    one or more cameras, each camera comprising one or more lenses configured such that the one or more cameras can each capture wide panoramic images or video or hemispherical images or video;
    at least one projection screen on the inner surface of the fuselage of the aircraft;
    an image projector configured to project images onto the at least one projection screen;
    an image data controller coupled to the at least one electronic display device and the image projector, the image data controller configured to control the at least one electronic display device and the image projector to display divided segments of an image data stream in synchronicity; and
    at least one illumination device;
    wherein both the at least one electronic display device and the at least one projection screen is configured to display at least an image data stream;
    wherein the image data controller is further configured to receive the image data stream, where the image data stream is captured substantially live by the one or more cameras or generated from a predefined or pre-recorded image data stream; and
    wherein the image data controller is further configured to control illumination parameters of the at least one illumination device to match with the received image data stream such that:
        if the image data stream was generated from a predefined or pre-recorded image data stream then the image data controller is configured such that if it receives a corresponding parameter adjustment sequence, with the predefined or pre-recorded image data stream, for the illumination parameters of the predefined or pre-recorded image data stream and the image data controller is configured to control and adjust the illumination parameters of the at least one illumination device according to the corresponding parameter adjustment sequence; and
        if the image data controller does not receive the corresponding parameter adjustment sequence, the image data controller is configured to analyze optical image parameters of the received image data stream and control and adjust the illumination parameters according to the optical image parameters analyzed.

2. The visual output assembly of claim 1, wherein the at least one electronic display device is next to the at least one projection screen.

3. The visual output assembly of claim 2, wherein a displaying surface of the at least one electronic display device is coplanar to a displaying surface of the at least one projection screen.

4. The visual output assembly of claim 1, wherein the at least one electronic display device includes at least one device selected from the group consisting of cathode ray tube displays, light-emitting diode displays, electroluminescent displays, electronic paper displays, plasma display panels, liquid crystal displays, high-performance addressing displays, thin-film transistor displays, organic light-emitting diode displays, surface-conduction electron-emitter displays, field emission displays, laser displays, carbon nanotube displays, quantum dot displays, interferometric modulator displays and digital microshutter displays.

5. The visual output assembly of claim 1, wherein the image projector includes at least one device selected from the group consisting of video projectors, movie projectors, overhead projectors, slide projectors, laser projectors and LED projectors.

6. The visual output assembly of claim 1, further comprising:
    a display driver coupled between the image data controller and the at least one electronic display device.

7. The visual output assembly of claim 1, wherein the image data controller is further configured to divide the image data stream into at least one first image data stream segment and at least one second image data stream segment, to control the at least one electronic display device to display the at least one first image data stream segment, and to control the image projector to project the at least one second image data stream segment to the at least one projection screen, wherein a spatial segmentation of the first image data stream segment and the second image data stream segment matches a spatial orientation of the at least one projection screen and the at least one electronic display device.

8. The visual output assembly of claim 1, wherein the one or more cameras are on an outside portion of the fuselage of the aircraft.

9. The visual output assembly of claim 1, wherein the at least one electronic display device is configured to display at least video at a minimum resolution of 3840 pixels by 2160 pixels.

10. An aircraft comprising a visual output assembly, the visual output assembly comprising:
    at least one electronic display device on an inner surface of a fuselage of the aircraft;
    one or more cameras, each camera comprising one or more lenses configured such that the one or more cameras can each capture wide panoramic images or video or hemispherical images or video;
    at least one projection screen on the inner surface of the fuselage of the aircraft;
    an image projector configured to project images onto the at least one projection screen;
    an image data controller coupled to the at least one electronic display device and the image projector, the image data controller configured to control the at least one electronic display device and the image projector to display divided segments of an image data stream in synchronicity; and at least one illumination device;

wherein both the at least one electronic display device and the at least one projection screen is configured to display at least an image data stream;

wherein the image data controller is further configured to receive the image data stream, where the image data stream is captured substantially live by the one or more cameras or generated from a predefined or pre-recorded image data stream; and wherein the image data controller is further configured to control illumination parameters of the at least one illumination device to match with the received image data stream such that:

if the image data stream was generated from a predefined or pre-recorded image data stream then the image data controller is configured such that if it receives a corresponding parameter adjustment sequence, with the predefined or pre-recorded image data stream, for the illumination parameters of the predefined or pre-recorded image data stream and the image data controller is configured to control and adjust the illumination parameters of the at least one illumination device according to the corresponding parameter adjustment sequence; and if the image data controller does not receive the corresponding parameter adjustment sequence, the image data controller is configured to analyze optical image parameters of the received image data stream and control and adjust the illumination parameters according to the optical image parameters analyzed.

11. The aircraft of claim 10, wherein the visual output assembly is mounted on a cabin wall of an aircraft cabin of the aircraft.

12. The aircraft of claim 10, wherein the one or more cameras are on an outside portion of the fuselage of the aircraft.

13. The aircraft of claim 10, wherein the at least one electronic display device is configured to display at least video at a minimum resolution of 3840 pixels by 2160 pixels.

14. A method for displaying visual output in an aircraft cabin of an aircraft, the method comprising:

displaying first image data items on at least one electronic display device on an inner surface of a fuselage of the aircraft;

providing one or more cameras, each camera comprising one or more lenses configured such that the one or more cameras can each capture wide panoramic images or video or hemispherical images or video;

projecting second image data items on at least one projection screen using an image projector configured to project images onto the at least one projection screen; and using an image data controller coupled to the at least one electronic display device and the image projector to control illumination parameters of at least one illumination device matching with the first image data items and/or the second image data items;

wherein the at least one projection screen is on the inner surface of the fuselage of the aircraft; and wherein at least the first image data items and the second image data items are components of an image data stream;

wherein the image data controller is configured to control the at least one electronic display device and the image projector to display divided segments of the image data stream in synchronicity;

wherein the image data controller is further configured to receive the image data stream, where the image data stream is captured substantially live by the one or more cameras or generated from a predefined or pre-recorded image data stream; and wherein the image data controller is configured to control illumination parameters of the at least one illumination device to match with the received image data stream such that:

if the image data stream was generated from a predefined or pre-recorded image data stream then the image data controller is configured such that if it receives a corresponding parameter adjustment sequence, with the predefined or pre-recorded image data stream, for the illumination parameters of the predefined or pre-recorded image data stream and the image data controller is configured to control and adjust the illumination parameters of the at least one illumination device according to the corresponding parameter adjustment sequence; and if the image data controller does not receive the corresponding parameter adjustment sequence, the image data controller is configured to analyze optical image parameters of the received image data stream and control and adjust the illumination parameters according to the optical image parameters analyzed.

15. The method of claim 14, wherein the first image data items and the second image data items are synchronized to each other.

16. The method of claim 15, wherein the first image data items and the second image data items are image data items belonging to a flight image phase scenario that are synchronized to the controlled illumination parameters of the at least one illumination device.

17. The method of claim 14, wherein the at least one electronic display device is configured to display at least video at a minimum resolution of 3840 pixels by 2160 pixels.

* * * * *